United States Patent
Ekambaram et al.

(10) Patent No.: US 10,172,043 B2
(45) Date of Patent: Jan. 1, 2019

(54) COGNITIVE RELIABILITY ENGINE FOR SMOOTH HANDOFF IN PHONE-HOSTED MICROSERVICES

(71) Applicant: International Business Machines Corporation, Armonk, NY (US)

(72) Inventors: Vijay Ekambaram, Chennai (IN); Pooja Malik, New Delhi (IN); Vikram Yadav, Farrukhabad (IN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 15/422,568

(22) Filed: Feb. 2, 2017

(65) Prior Publication Data

US 2018/0220334 A1    Aug. 2, 2018

(51) Int. Cl.
| | |
|---|---|
| H04W 36/00 | (2009.01) |
| H04W 4/18 | (2009.01) |
| H04W 40/24 | (2009.01) |
| H04L 12/26 | (2006.01) |
| H04W 8/00 | (2009.01) |

(52) U.S. Cl.
CPC ......... *H04W 36/0011* (2013.01); *H04L 43/16* (2013.01); *H04W 4/18* (2013.01); *H04W 8/005* (2013.01); *H04W 40/244* (2013.01)

(58) Field of Classification Search
CPC ... H04W 36/0011; H04W 4/18; H04W 8/005; H04W 40/244; H04L 43/16
See application file for complete search history.

(56) References Cited

U.S. PATENT DOCUMENTS

| | | |
|---|---|---|
| 6,604,140 B1 | 8/2003 | Beck et al. |
| 8,990,639 B1* | 3/2015 | Marr ................... G06F 11/30 714/25 |
| 9,264,538 B2 | 2/2016 | Kotecha et al. |
| 9,848,380 B1 | 12/2017 | Ekambaram et al. |
| 2014/0195654 A1 | 7/2014 | Kiukkonen et al. |
| 2017/0195438 A1* | 7/2017 | Schneider ............ H04L 67/325 |
| 2017/0359217 A1* | 12/2017 | Ahuja ................. H04L 41/0816 |
| 2017/0364434 A1* | 12/2017 | Kairali ............... G06F 11/3668 |

OTHER PUBLICATIONS

Schulman, J. "iPhone Personal Hotspot transmitting GPS information to tethered iPads? (Update: no)", retrieved from https://www.engadget.com/2011/03/16/iphone-personal-hotspot-transmitting-gps-information-to-tethered/; Mar. 2011.

(Continued)

*Primary Examiner* — Duc C Ho
(74) *Attorney, Agent, or Firm* — Brown & Michaels, PC; David Woycechowsky

(57) ABSTRACT

Managing handoffs between a plurality of mobile devices in a phone hosted microservices architecture in a same vicinity, with each of the mobile devices connected to a cognitive reliability engine. The cognitive reliability engine, for each of the plurality of mobile devices hosting a hosted microservice, determining a reliability score for a time period through context and activity recognition of a user owning the mobile device. Depending on the reliability score, different beacons with data packets indicating that the microservice will end, the microservice may end, or the microservice will continue with surety for a specific time period.

18 Claims, 7 Drawing Sheets

(56) References Cited

OTHER PUBLICATIONS

Ko et al. "Sensor Virtualization Module: Virtualizing IoT Devices on Mobile Smartphones for Effective Sensor Data Management", Hindawi Publishing Corporation, International Journal of Distributed Sensor Networks vol. 2015, Article ID 730762, 10 pages, Aug. 2015.
Kwapisz et al. "Activity Recognition using Cell Phone Accelerometers", SensorKDD '10, Jul. 25, 2010.
Dulay et al. "Activity Recognition from Mobile Phone Data: State of the Art, Prospects and Open Problems", Imperial College London, 2009.
Mantyjari, M. "Sensor-based context recognition for mobile applications", Academic dissertation, University of Oulu, Dec. 2003.
Wang et al. "Mobility-Induced Service Migration in Mobile Micro-Clouds", Military Communications Conference, 2014.
Ciftcioglu et al. "Security-aware Service Migration for Tactical Mobile Micro-Clouds", Military Communications Conference, 2015.
Lawson et al. "Mobile Cloud Enabled Sensor Services: Opportunities, Challenges and Approaches", 2015 IEEE International Conference on Mobile Services; 2015.
Bose et al. "Towards a Sensor-Cloud Infrastructure with Sensor Virtualization", MSCC'15, Jun. 22, 2015, Hangzhou, China.
Wang et al. "Adaptive Search-based Service Migration with Virtual Moves in Clouds for Mobile Accesses", 2013 IEEE/ACM 6th International Conference on Utility and Cloud Computing; 2013.
Wang et al. "Emulation-Based Study of Dynamic Service Placement in Mobile Micro-Clouds", Milcom 2015 Track 5, Selected Topics in Communications; 2015.
Wang et al. "On Service Migration in the Cloud to Facilitate Mobile Accesses", 2013 IEEE International Conference on Cluster Computing (CLUSTER); 2013.
Wang et al. "On Data Staging Strategies for Mobile Accesses to Cloud Services", 2011 Fourth IEEE International Conference on Utility and Cloud Computing; 2011.
Kaur et al. "Visualizing Clouds on Different Stages of DWH—An Introduction to Data Warehouse as a Service", 2012 International Conference on Computing Sciences; 2012.
Daya et al. "Microservices from Theory to Practice: Creating Applications in IBM Bluemix Using the Microservices Approach" Aug. 2015.

\* cited by examiner

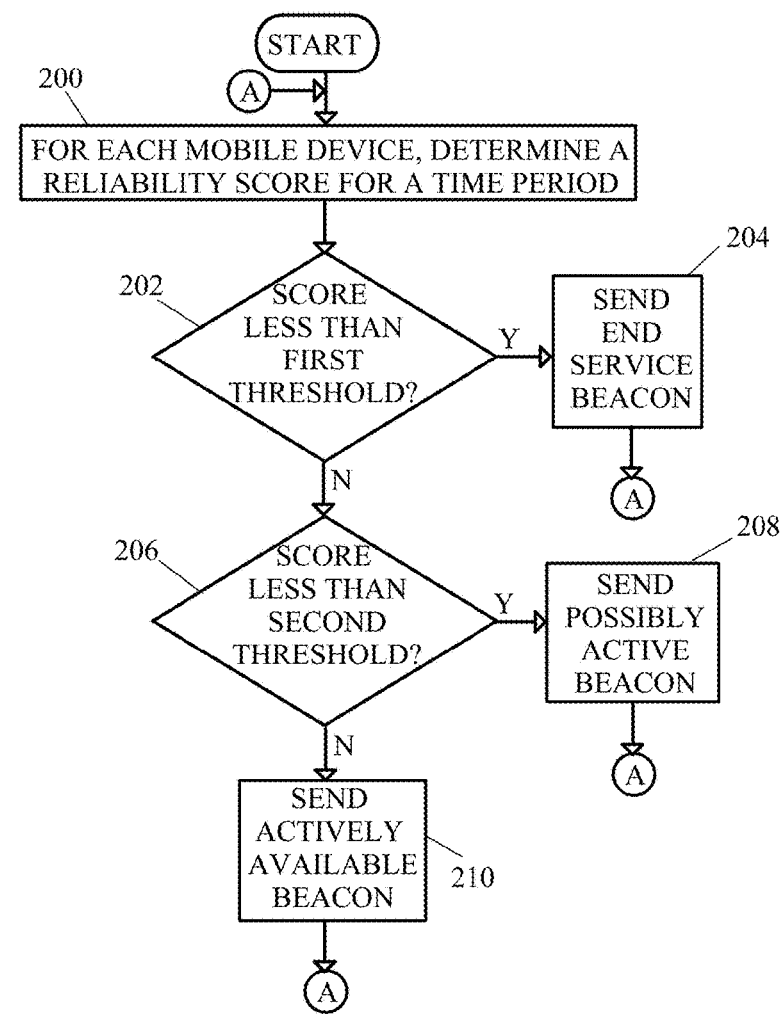

COGNITIVE RELIABILITY ENGINE FOR SMOOTH HANDOFF IN PHONE-HOSTED MICROSERVICES

BACKGROUND

The present invention relates to microservices architecture, and more specifically to phone-hosted microservices.

Microservices are a suite of independently deployable, small, modular services in which each service runs a unique process and communicates through a well-defined, lightweight mechanism to serve a business goal.

Microservices is an architecture style, in which large complex software applications are composed of one or more services. Microservices can be deployed independently of one another and are loosely coupled. Each of these microservices focuses on completing one task only and does that one task really well. In all cases, that one task represents a small business capability.

In a phone-hosted microservice, mobile devices can host their local hardware/software features as local services consumable by other near-by mobile devices. Some examples include hosting a global positioning system (GPS) as a phone-hosted microservice or hosting 3G as a phone-hosted microservice through WiFi Tethering. Phone-hosted microservices can provide capabilities to a user beyond their device's ability, and the device can cooperatively integrate to provide better services.

SUMMARY

According to one embodiment of the present invention, a method of managing handoffs between a plurality of mobile devices in a phone hosted microservices architecture in a same vicinity is disclosed. Each of the mobile devices is connected to a cognitive reliability engine. The method comprising the steps of: the cognitive reliability engine, for each of the plurality of mobile devices hosting a hosted microservice, determining a reliability score for a time period through context and activity recognition of a user owning the mobile device; when the reliability score for a mobile device hosting the hosted microservice is less than a first threshold, the cognitive reliability engine emitting a beacon with a data packet to other mobile devices within the vicinity indicating that the hosted microservice will end and will be unavailable within a first time period, and that the mobile devices utilizing the hosted microservice need to search for and switch to another device hosting the same microservice; and when the reliability score for a mobile device hosting the hosted microservice is greater than the first threshold, and greater than a second threshold, the cognitive reliability engine emitting a beacon with a data packet to other mobile devices within the vicinity indicating that the hosted microservice will be definitively active for a time period and that the mobile device utilizing the hosted microservice execute critical transactions utilizing the hosted microservice within the time period.

According to another embodiment, a computer program product for managing handoffs between a plurality of mobile devices in a phone hosted microservices architecture in a same vicinity is disclosed. Each of the mobile devices is connected to a cognitive reliability engine, the cognitive reliability engine comprising at least one processor, one or more memories, one or more computer readable storage media, the computer program product comprising a computer readable storage medium having program instructions embodied therewith. The program instructions executable by the computer to perform a method comprising: for each of the plurality of mobile devices hosting a hosted microservice, determining, by the cognitive reliability engine, a reliability score for a time period through context and activity recognition of a user owning the mobile device; when the reliability score for a mobile device hosting the hosted microservice is less than a first threshold, emitting, by the cognitive reliability engine, a beacon with a data packet to other mobile devices within the vicinity indicating that the hosted microservice will end and will be unavailable within a first time period, and that the mobile devices utilizing the hosted microservice need to search for and switch to another device hosting the same microservice; and when the reliability score for a mobile device hosting the hosted microservice is greater than the first threshold, and greater than a second threshold, emitting, by the cognitive reliability engine, a beacon with a data packet to other mobile devices within the vicinity indicating that the hosted microservice will be definitively active for a time period and that the mobile device utilizing the hosted microservice execute critical transactions utilizing the hosted microservice within the time period.

According to another embodiment, a computer system for managing handoffs between a plurality of mobile devices in a phone hosted microservices architecture in a same vicinity, with each of the mobile devices connected to a cognitive reliability engine. The cognitive reliability engine comprising at least one processor, one or more memories, one or more computer readable storage media having program instructions executable by the computer to perform the program instructions comprising: for each of the plurality of mobile devices hosting a hosted microservice, determining, by the cognitive reliability engine, a reliability score for a time period through context and activity recognition of a user owning the mobile device; when the reliability score for a mobile device hosting the hosted microservice is less than a first threshold, emitting, by the cognitive reliability engine, a beacon with a data packet to other mobile devices within the vicinity indicating that the hosted microservice will end and will be unavailable within a first time period, and that the mobile devices utilizing the hosted microservice need to search for and switch to another device hosting the same microservice; and when the reliability score for a mobile device hosting the hosted microservice is greater than the first threshold, and greater than a second threshold, emitting, by the cognitive reliability engine, a beacon with a data packet to other mobile devices within the vicinity indicating that the hosted microservice will be definitively active for a time period and that the mobile device utilizing the hosted microservice execute critical transactions utilizing the hosted microservice within the time period.

BRIEF DESCRIPTION OF THE DRAWINGS

FIG. 2 shows a flow diagram of a method of managing handoffs in a microservices architecture.

DETAILED DESCRIPTION

It is recognized that reliability is a concern with phone-hosted microservices. Since mobile devices are highly locomotive, traditional reliability aspects of cloud web services cannot be directly applied to phone-hosted microservices.

In an embodiment of the present invention, a cognitive reliability engine manages microservice handoffs between devices with a manual delay for easy consumption of phone-hosted microservices.

Figure 1:
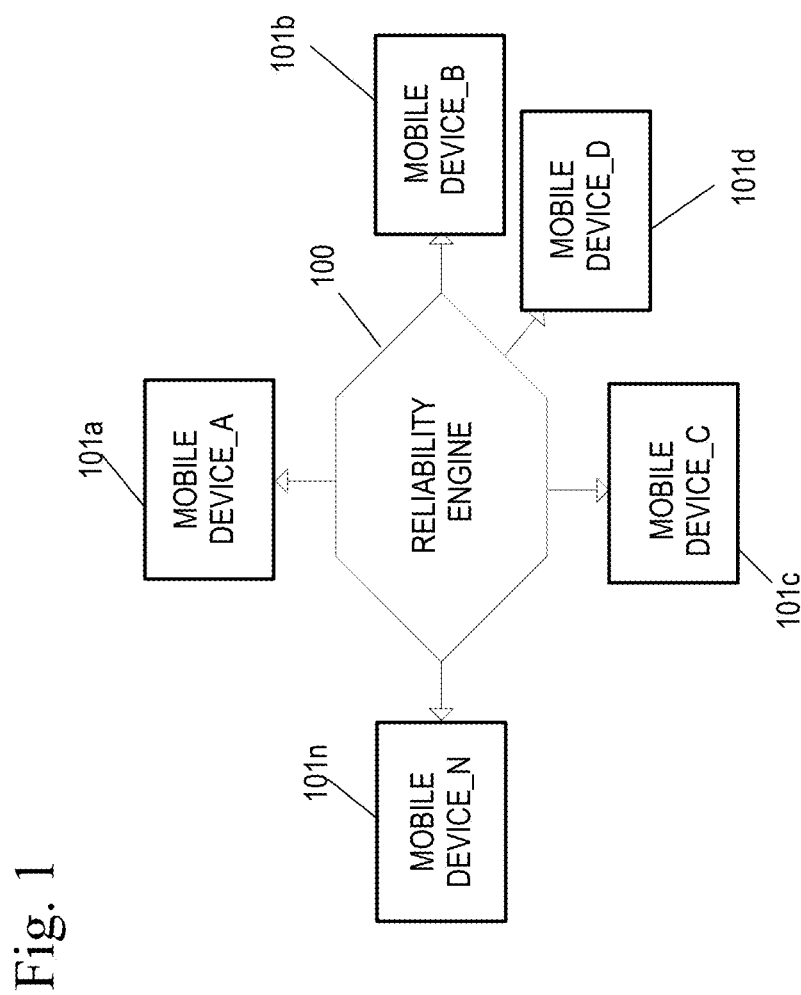
FIG. 1 shows a schematic of an example of phone microservices architecture.

FIG. 1 shows a schematic of an example of phone microservices architecture. A cognitive reliability engine (100) is connected to each of the mobile devices, mobile devices_A-N (101a-101n). Each of the mobile devices are considered to be a deployable, small, modular service in which each of the mobile devices runs a unique process, for example, whatever service is being hosted, and communicates through the cognitive reliability engine (100).

A microservice handoff would work as follows: Mobile Devices A, B, C, and D (101a-101d) are in a same location. The location may be further defined to a specific area based on connectivity between the devices. Mobile Devices A and B (101a, 101b) are hosting global positioning system (GPS) services and Mobile Devices C and D (101c, 101d) are using the GPS services hosted by Mobile Device A (101a). When Mobile Device A (101a) moves out of range of Mobile Devices C and D (101c, 101d), Mobile Devices C and D (101c, 101d) have to switch back to the GPS feature associated with the hardware of Mobile Devices C and D (101c, 101d) or connect to the GPS service hosted by Mobile Device B (101b). The intermittent delay to switch the GPS capability from Mobile Device A (101a) to Mobile Device B (101b) is referred to as the handoff during service consumption. It is recognized that, for a stable system, this hand-off should be maintained as being as minimal as possible.

A cognitive reliability engine (100) manages the handoff to maintain a minimal delay for easy consumption of phone-hosted microservices between Mobile Devices C and D (101c, 101d) with Mobile Device B (101b). The cognitive reliability engine (100) determines a reliability score of the devices hosting the microservice. The cognitive reliability engine (100) uses context analysis in reference to numerous factors to determine the probability that a mobile device hosting a microservice will be available for n seconds. The cognitive reliability engine (100) sends various beacons to mobile devices using the hosted services depending on whether the reliability score is less than preset thresholds. The beacons provide a status regarding the hosted microservice to the mobile device using the hosted services for a certain time period.

FIG. 2 shows a flow diagram of a method of managing handoffs in a microservices architecture.

In a first step, the cognitive reliability engine (100), for each mobile device which is hosting a microservice, determines a reliability score for a time period, for example, every "x" seconds, by performing context and activity recognition of the user owning the mobile device (X1) (step 200). The reliability score may be between 0 and 1. The reliability score is an estimate of the whether the mobile device hosting the microservice is going to leave the vicinity or location and is calculated at a high frequency when the mobile device is in a vicinity or location. The reliability score may be calculated, for example every five seconds or less.

The reliability score may be determined by cognitively predicting a possibility or probability that the user and their associated mobile device are going to leave the vicinity. The probability is based on activity of the user, calendar entries of the user, audio signals, and other user manual inputs. An example of user manual inputs may be, but is not limited to any new transaction which the user may initiate, such as watching a video, payment of a bill, booking a taxi, etc.

The activity of the user may be determined using various sensors of the mobile device, such as an accelerometer, gyroscope, etc. For example, the sensors may determine whether the user is walking, running, or performing some other activity in which the user is engaged.

Context analysis may be used in association with calendar entries of the user on the mobile device to determine whether the user would be leaving the vicinity or location. Context analysis may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one calendar entry may shed light on the meaning of text elements in another calendar entry by the user, repeat appointments).

A microphone or listening devices of the mobile device may be used to "hear" audio signals within the vicinity and determine context associated with the audio signals. For example, determining that a user states "leaving in five minutes" or "I have to leave now".

The greater the possibility of the user and their associated mobile device leaving the vicinity, the smaller the reliability score.

If the reliability score of a mobile device hosting a microservice is less than a first threshold (step 202), beacons with a data packet indicating that the hosted service will end in "n" seconds is sent to all devices within the vicinity (step 204). The beacon with the data packet indicating the hosted service will end indicates that the host service will not be available after the "n" seconds and the hosted service provided will no longer be active. After the beacon is sent, the method returns to step 200 of determining a reliability score.

All of the service using mobile devices which are currently utilizing the hosted service of the mobile device which emitted the packet with the end information immediately switches to another mobile device hosting the same service if available, or reverts to the native hardware and software features of the mobile device to ensure a smooth and safe (non-execution of critical transactions using the hosted service) service handoff.

If the reliability score of a mobile device hosting a microservice is greater than a first threshold (step 202), and the reliability score of a mobile device is less than a second threshold, but greater than the first threshold (step 206), beacons with a data packet indicating that the hosted service is possibly active for the next "n" seconds are sent (step 208) and the method returns to step 200 of determining a reliability score. The "possibly active" data packet indicates that the active status for the next "n" seconds is within a probability that is less than 50%. The beacon would indicate to the mobile devices using the microservices that there is a possibility that the hosting device may leave the vicinity and searches for other devices in the vicinity hosting the same microservice, allowing for a minimal time delay in transitioning between hosted microservices.

If the reliability score of a mobile device hosting a microservice is greater than a first threshold (step 202), and the reliability score of a mobile device is greater than a second threshold (step 206), beacons with a data packet indicating that the hosted service is actively available with a strong probability for the next "n" seconds are sent (step 210) and the method returns to step 200 of determining a reliability score.

The thresholds may be configurable. For example, the reliability score associated with a beacon containing a data packet indicating that the hosted service is actively available may be 0.8 to 1.0. The reliability score associated with a beacon containing a data packet indicating that the host service is possible active may be greater than or equal to 0.5, but less than 0.8 and a reliability score associated with a beacon with a data packet indicating that the hosted service will end is less than 0.5. Other ranges for the beacons may be set. Therefore, based on the reliability score ranges described, the first threshold of the method is a reliability score of 0.5 and the second threshold of the method is a reliability score of 0.8.

The mobile devices utilizing the hosted services, after receiving the beacon with the data packet indicating that the hosted service is actively available with a strong probability for the next "n" seconds, will execute any critical transactions using the hosted service within the next "n" seconds to reduce any penalties if the hosted service were to become unavailable.

The method ends for the mobile device hosting a service when the mobile device leaves the vicinity and for the mobile device receiving the hosted service when the mobile device leaves the vicinity or there are no other mobile devices hosting the service needed.

Based on the type of beacon emitted from the hosting mobile device which is based on reliability score, the mobile devices consuming the microservices can take appropriate actions prior to the hosted service being unavailable, minimizing delay of consumption of hosted services.

FIGS. 3a-3d shows a flow diagram of a possible implementation of the method of FIG. 2.

Figure 3A:
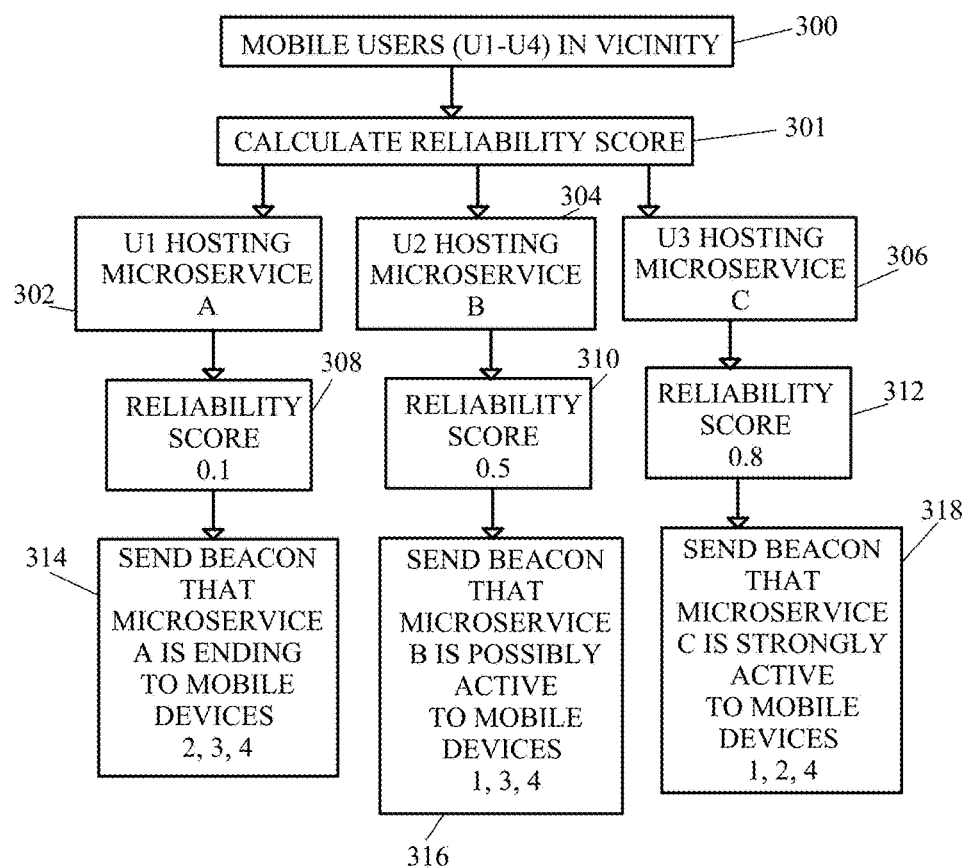
FIG. 3a shows a flow diagram of a possible implementation of the method of FIG. 2.

For example, referring to FIG. 3a, Mobile Users U1, U2, U3, and U4 are present in a same vicinity (300). Mobile device A (101a) is associated with Mobile User 1 (U1), mobile device B (101b) is associated with Mobile User 2 (U2), mobile device C (101c) is associated with Mobile User 3 (U3), and mobile device D (101d) is associated with Mobile User 4 (U4). Mobile Device A (101a) is hosting microservice A (302). Mobile Device B (101b) is hosting microservice B (304). Mobile Device C (101c) is hosting microservice C (306) and mobile device D (101d) is not hosting any services. For this example, mobile device D (101d) is utilizing microservices from mobile devices A-C. While not shown, Mobile Devices A-C may also be using microservices from the other mobile devices.

The cognitive reliability engine (100) determines a reliability score (301) for Mobile Users U1, U2, U3 and their associated mobile devices A, B, C (101a-101c) respectively. The reliability score is recalculated at the end of the time period associated with the previously calculated reliability score.

The reliability score for U1 at time 1 is 0.1 based on current activities of the user (308). The reliability score for U2 is 0.5 at time 1 (310), and the reliability score for U3 is 0.8 at time 1 (312). Since U4 of mobile device D (101d) is not hosting any services, a reliability score is not calculated.

Based on the reliability score calculated at time 1 of 0.8 for mobile device C (101c) of U3, the cognitive reliability engine (100) would send beacons with a data packet indicating that the hosted microservice C is actively available with a strong probability for the next "80" seconds to mobile devices (318), such as mobile devices A, B, and D.

Based on the reliability score of 0.5 calculated at time 1 for mobile device B of U2, the cognitive reliability engine 100 would send beacons with a data packet indicating that the hosted microservice B is possibly active for the next "40" seconds (316).

Based on the reliability score of 0.1 calculated at time 1 for mobile device A of U1, based in part on a calendar appointment for U1 in fifteen minutes taking place in another location, the cognitive reliability engine 100 would send ending beacons with a data packet indicating that the hosted microservice A is ending in "60" seconds (314).

After the time period associated with each of the reliability scores has elapsed, the reliability score is recalculated and the associated beacons are sent as appropriate.

Figure 3B:
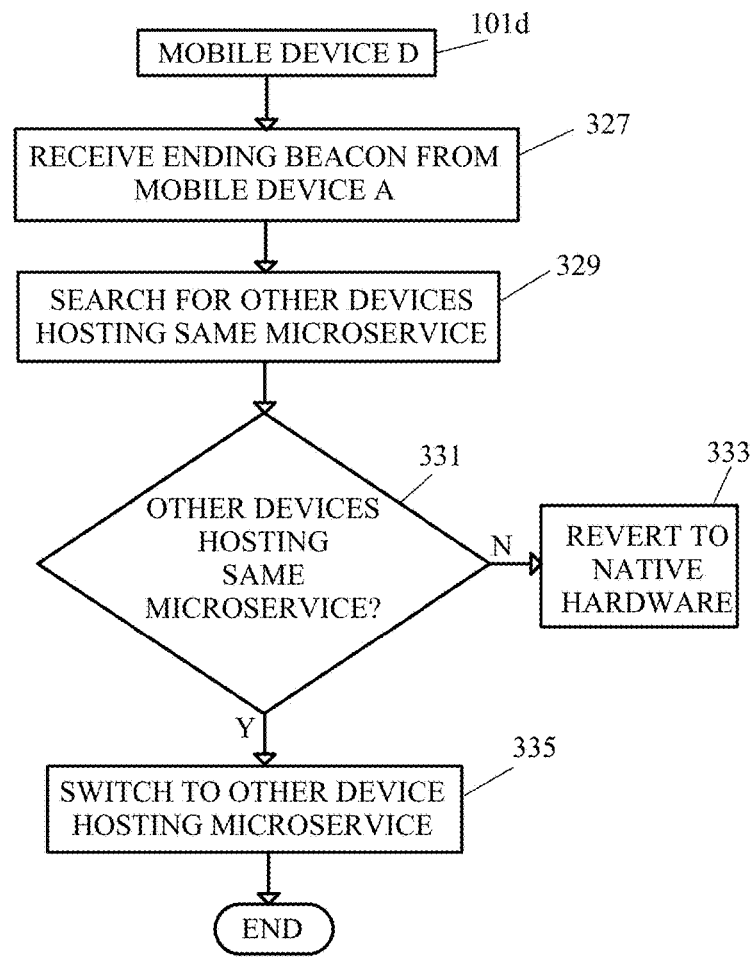
FIG. 3b shows a flow diagram of a mobile device receiving an ending beacon.
Figure 3C:
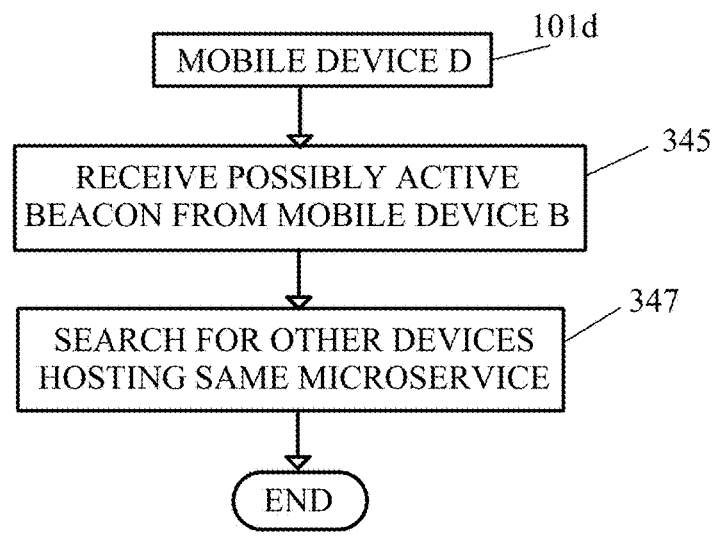
FIG. 3c shows a flow diagram of a mobile device receiving a possibly active beacon.
Figure 3D:
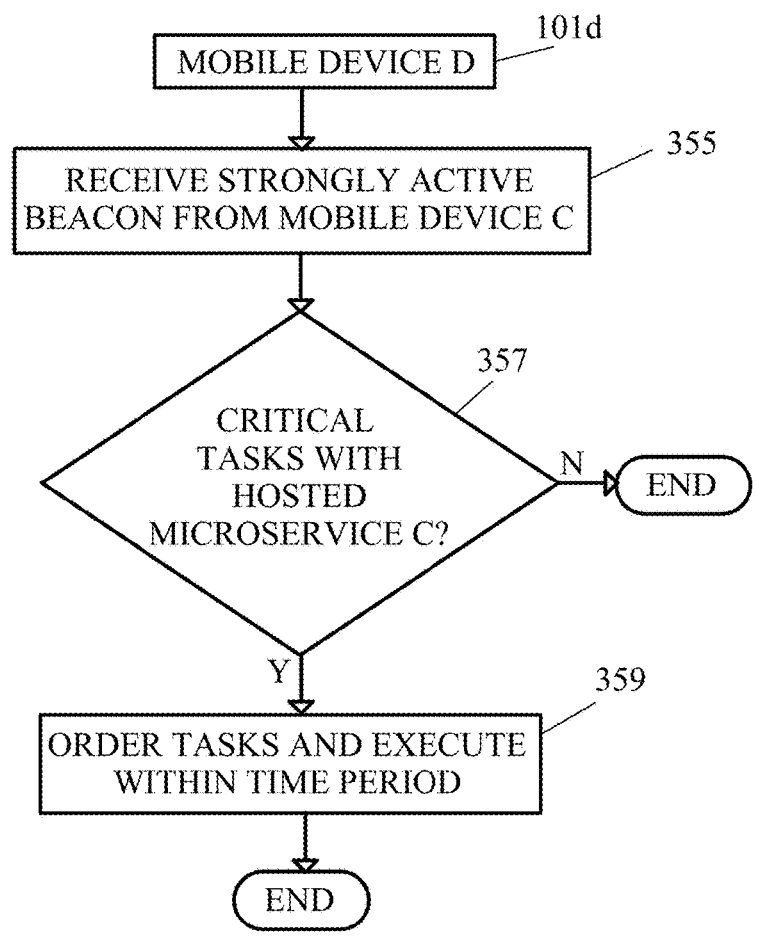
FIG. 3d shows a flow diagram of a mobile device receiving a strongly active beacon.

FIGS. 3b-3d show the steps that a mobile device would undertake depending on the beacon received from the hosting mobile device via the cognitive reliability engine (100). For this example, Mobile Device D (101d) is using the hosted microservices A, B, and C from Mobile Devices A, B, and C (101a, 101b, 101c) respectively. While not discussed, other mobile devices may also be using the hosted microservices.

Referring to FIG. 3b, mobile device D (101d) receives an ending beacon from mobile device A (step 327). In this example, based on the ending data packet, the mobile devices which receive this beacon would immediately and actively search for and determine if any other mobile devices (i.e. mobile devices B, C) within the vicinity are hosting the same microservice as mobile device A (step 329). If another device is hosting the same microservice (step 331), the mobile device D switches to the other mobile device hosting the microservice (step 335), for example within the 60 seconds. If no other devices are hosting the same microservice (step 335), the mobile device reverts back to native hardware and software (step 333) and the method ends.

Referring to FIG. 3c, mobile device D (101d), receives a possibly active beacon with a data packet indicating that the hosted microservice B is possibly active for a period of time (step 345). The mobile devices which receives this beacon would determine if any other mobile devices (i.e. mobile devices A, C) within the vicinity are hosting the same microservice as mobile device B (step 347), such that if the reliability score were to change for mobile device B and an ending beacon were to be sent, mobile device D has already determined other mobile devices hosting the microservice.

Referring to FIG. 3d, mobile device (101d) receives a strongly active beacon with a data packet indicating that the hosted microservice C is definitively going to be active for a time period, for example the next 80 seconds (step 355). The mobile device determines if there are any critical tasks being undertaken using the hosted microservice C (step 357). If critical tasks need to be executed (step 359), the critical steps are ordered and executed within the time period and the method ends.

Figure 4:
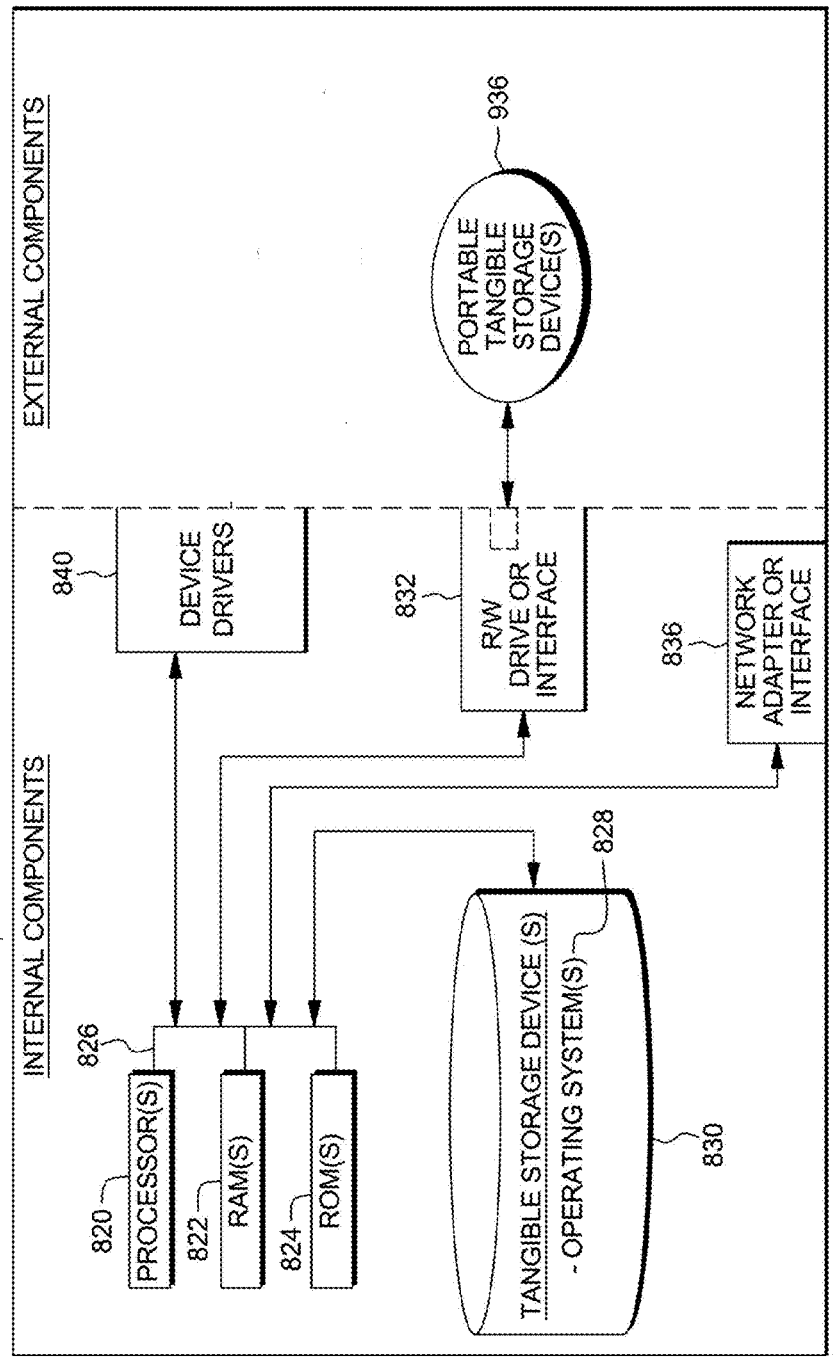
FIG. 4 illustrates internal and external components of a client computer, such as a mobile device, in which illustrative embodiments may be implemented.

FIG. 4 illustrates internal components of a mobile device in which illustrative embodiments may be implemented. The internal components 800a include at least one or more processors 820, one or more computer-readable RAMs 822 and one or more computer-readable ROMs 824 on one or more buses 826, and one or more operating systems 828 and one or more computer-readable tangible storage devices 830. The one or more operating systems 828 is stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The internal components 800*a* also include a R/W drive or interface 832 to read from and write to one or more portable computer-readable tangible storage devices 936 such as a CD-ROM, DVD, memory stick, magnetic tape, magnetic disk, optical disk or semiconductor storage device.

The internal components 800*a* also include a network adapter or interface 836 such as a TCP/IP adapter card. The cognitive reliability engine 100 can be downloaded to the mobile device from an external computer via a network (for example, the Internet, a local area network or other, wide area network) and network adapter or interface 836. From the network adapter or interface 836, cognitive reliability engine 100 is loaded into hard drive 830. The cognitive reliability engine 100 can be downloaded to the server computer 54 from an external computer via a network (for example, the Internet, a local area network or other, wide area network) and network adapter or interface 836. From the network adapter or interface 836, cognitive reliability engine 100 is loaded into hard drive 830. The network may comprise copper wires, optical fibers, wireless transmission, routers, firewalls, switches, gateway computers and/or edge servers.

The internal components 800*a* also includes device drivers 840 to interface to other external components (not shown). The device drivers 840, R/W drive or interface 832 and network adapter or interface 836 comprise hardware and software (stored in storage device 830 and/or ROM 824).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing handoffs between a plurality of mobile devices in a phone hosted microservices architecture in a same vicinity, with each of the mobile devices connected to a cognitive reliability engine, the method comprising the steps of:
   the cognitive reliability engine, for each of the plurality of mobile devices hosting a hosted microservice, determining a reliability score for a time period through context and activity recognition of a user owning the mobile device;
   when the reliability score for a mobile device hosting the hosted microservice is less than a first threshold, the cognitive reliability engine emitting a beacon with a data packet to other mobile devices within the vicinity indicating that the hosted microservice will end and will be unavailable within a first time period, and that the mobile devices utilizing the hosted microservice need to search for and switch to another device hosting the same microservice; and
   when the reliability score for a mobile device hosting the hosted microservice is greater than the first threshold, and greater than a second threshold, the cognitive reliability engine emitting a beacon with a data packet to other mobile devices within the vicinity indicating that the hosted microservice will be definitively active for a time period and that the mobile device utilizing the hosted microservice execute critical transactions utilizing the hosted microservice within the time period.

2. The method of claim 1, wherein the reliability score is between zero and one.

3. The method of claim 1, wherein the reliability score represents an estimate of whether the mobile device hosting the microservice is going to leave a vicinity relative to other mobile devices.

4. The method of claim 1, wherein the reliability score is based on cognitive analysis of content on a mobile device hosting the microservice.

5. The method of claim 4, wherein the content subject to cognitive analysis is calendar entries for the user of the mobile device hosting the microservice.

6. The method of claim 1, wherein, if the hosted microservice is unavailable from another device after the reliability is less than the first threshold, the mobile device utilizing the hosted microservice reverts to native hardware of the mobile device.

7. A computer program product for managing handoffs between a plurality of mobile devices in a phone hosted microservices architecture in a same vicinity, with each of the mobile devices connected to a cognitive reliability engine, the cognitive reliability engine comprising at least one processor, one or more memories, one or more computer readable storage media, the computer program product comprising a computer readable storage medium having program instructions embodied therewith, the program instructions executable by the computer to perform a method comprising:
   for each of the plurality of mobile devices hosting a hosted microservice, determining, by the cognitive reliability engine, a reliability score for a time period through context and activity recognition of a user owning the mobile device;
   when the reliability score for a mobile device hosting the hosted microservice is less than a first threshold, emitting, by the cognitive reliability engine, a beacon with a data packet to other mobile devices within the vicinity indicating that the hosted microservice will end and will be unavailable within a first time period, and that the mobile devices utilizing the hosted microservice need to search for and switch to another device hosting the same microservice; and
   when the reliability score for a mobile device hosting the hosted microservice is greater than the first threshold, and greater than a second threshold, emitting, by the cognitive reliability engine, a beacon with a data packet to other mobile devices within the vicinity indicating that the hosted microservice will be definitively active for a time period and that the mobile device utilizing the hosted microservice execute critical transactions utilizing the hosted microservice within the time period.

8. The computer program product of claim 7, wherein the reliability score is between zero and one.

9. The computer program product of claim 7, wherein the reliability score represents an estimate of whether the mobile device hosting the microservice is going to leave a vicinity relative to other mobile devices.

10. The computer program product of claim 7, wherein the reliability score is based on cognitive analysis of content on a mobile device hosting the microservice.

11. The computer program product of claim 10, wherein the content subject to cognitive analysis is calendar entries for the user of the mobile device hosting the microservice.

12. The computer program product of claim 7, wherein, if the hosted microservice is unavailable from another device after the reliability is less than the first threshold, the mobile device utilizing the hosted microservice reverts to native hardware of the mobile device.

13. A computer system for managing handoffs between a plurality of mobile devices in a phone hosted microservices architecture in a same vicinity, with each of the mobile devices connected to a cognitive reliability engine, the cognitive reliability engine comprising at least one processor, one or more memories, one or more computer readable storage media having program instructions executable by the computer to perform the program instructions, the at least one processor of the cognitive reliability engine performing the program instructions comprising:

for each of the plurality of mobile devices hosting a hosted microservice, determining, by the at least one processor of the cognitive reliability engine, a reliability score for a time period through context and activity recognition of a user owning the mobile device;

when the reliability score for a mobile device hosting the hosted microservice is less than a first threshold, emitting, by the at least one processor of the cognitive reliability engine, a beacon with a data packet to other mobile devices within the vicinity indicating that the hosted microservice will end and will be unavailable within a first time period, and that the mobile devices utilizing the hosted microservice need to search for and switch to another device hosting the same microservice; and when the reliability score for a mobile device hosting the hosted microservice is greater than the first threshold, and greater than a second threshold, emitting, by the at least one processor of the cognitive reliability engine, a beacon with a data packet to other mobile devices within the vicinity indicating that the hosted microservice will be definitively active for a time period and that the mobile device utilizing the hosted microservice execute critical transactions utilizing the hosted microservice within the time period.

14. The computer system of claim 13, wherein the reliability score is between zero and one.

15. The computer system of claim 13, wherein the reliability score represents an estimate of whether the mobile device hosting the microservice is going to leave a vicinity relative to other mobile devices.

16. The computer system of claim 13, wherein the reliability score is based on cognitive analysis of content on a mobile device hosting the microservice.

17. The computer system of claim 16, wherein the content subject to cognitive analysis is calendar entries for the user of the mobile device hosting the microservice.

18. The computer system of claim 13, wherein, if the hosted microservice is unavailable from another device after the reliability is less than the first threshold, the mobile device utilizing the hosted microservice reverts to native hardware of the mobile device.

* * * * *